INVENTORS
J.Q. WOOD
A.A. HOFFMAN, JR.
BY Young & Quigg
ATTORNEYS

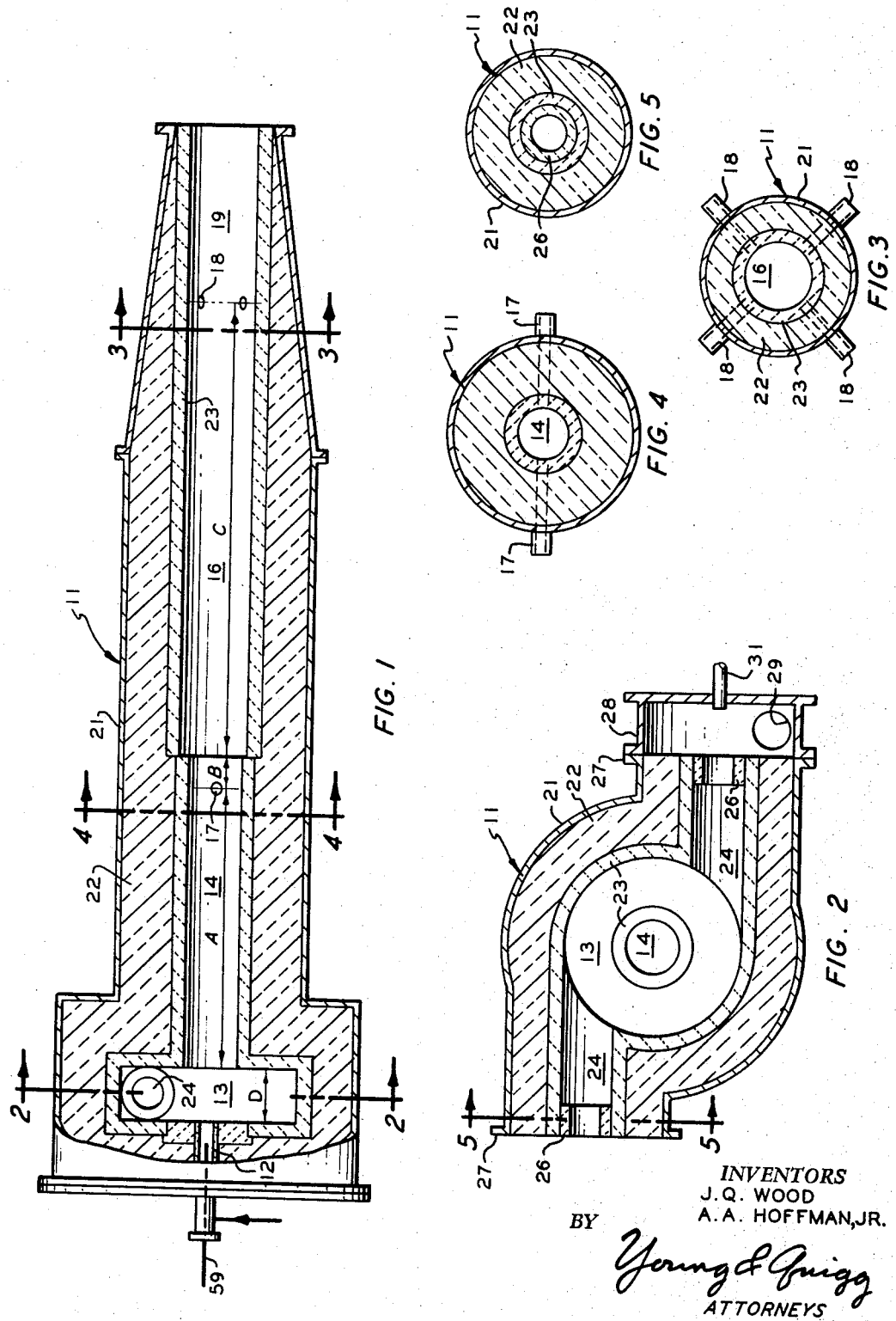

United States Patent Office

3,362,790
Patented Jan. 9, 1968

3,362,790
FURNACE FOR MAKING HIGH ABRASION AND INTERMEDIATE SUPER ABRASION FURNACE CARBON BLACKS
James Q. Wood and Alfred A. Hoffman, Jr., Bartlesville, Okla., assignors to Phillips Petroleum Company, a corporation of Delaware
Filed Apr. 23, 1965, Ser. No. 450,459
2 Claims. (Cl. 23—259.5)

This invention relates to a combination furnace for making high abrasion furnace carbon black (hereinafter called HAF black) under a first set of conditions and for making intermediate super abrasion furnace carbon black (hereinafter called ISAF black) under a second set of conditions, and to processes of operating the furnace under said first and second set of conditions.

In the prior art, in order to make both HAF and ISAF black in a carbon black plant, it has been necessary to have two furnaces, one for HAF and the other for ISAF black. The present invention consists of a single furnace adapted under two sets of conditions to make either HAF or ISAF black. This reduces the number of furnaces needed in such a plant by one-half without reducing the rate at which either type of barbon black is produced.

In the prior art, the air input and roughly the resulting effluent smoke output of the prior art HAF reactor is less than ⅞ that of the prior art ISAF reactor. As a result, the bag filter system for handling eight prior art HAF reactors can only handle seven or less prior art ISAF reactors. In the present invention, due to the use of a first smaller diameter reaction section connected in series downstream to an enlarged diameter reaction section, with a quench in each reaction section adapted to be used selectively, the same furnace can be employed as an HAF reactor by using only the downstream quench or as an ISAF reactor by using the upstream quench, and the air input rate and roughly the resulting effluent smoke output rate will be substantially the same, whereby the same air compression system and same bag filter system can be economically designed and employed at an optimum size for the same number of furnaces of the present invention, regardless of whether they are being used as HAF or ISAF furnaces. The tangential fuel rate also remains the same.

One object of this invention is to provide in combination a carbon black plant having an optimum size air compressor system and bag filtering system for its furnaces, regardless of whether these furnaces are being used to produce HAF or ISAF carbon black.

Another object is to provide a furnace for making either HAF or ISAF carbon black which uses the same amount of compressed air at the same temperature and pressure when producing HAF carbon black as it does when used to produce ISAF carbon black.

Another object is to produce an improved carbon black furnace and processes of operating the same, adapted to produce either HAF carbon black or ISAF carbon black in the same furnace.

Another object is to reduce the number of furnaces in a plant producing both HAF and ISAF black by about one-half without reducing the rate of output of the black being made.

Numerous other objects and advantages will be obvious to those skilled in the art upon reading the accompanying specification, claims and drawings.

In the drawings:

FIGURE 1 is an elevational view, with the major portion broken away in cross section, of a carbon black furnace embodying the present invention.

FIGURES 2 to 4 are cross sections of the furnace shown in FIGURE 1 taken at the lines 2—2, 3—3 and 4—4 looking in the direction indicated by the arrows.

FIGURE 5 is a cross section of a portion of FIGURE 2 taken at the line 5—5 looking in the direction indicated.

Figure 6:
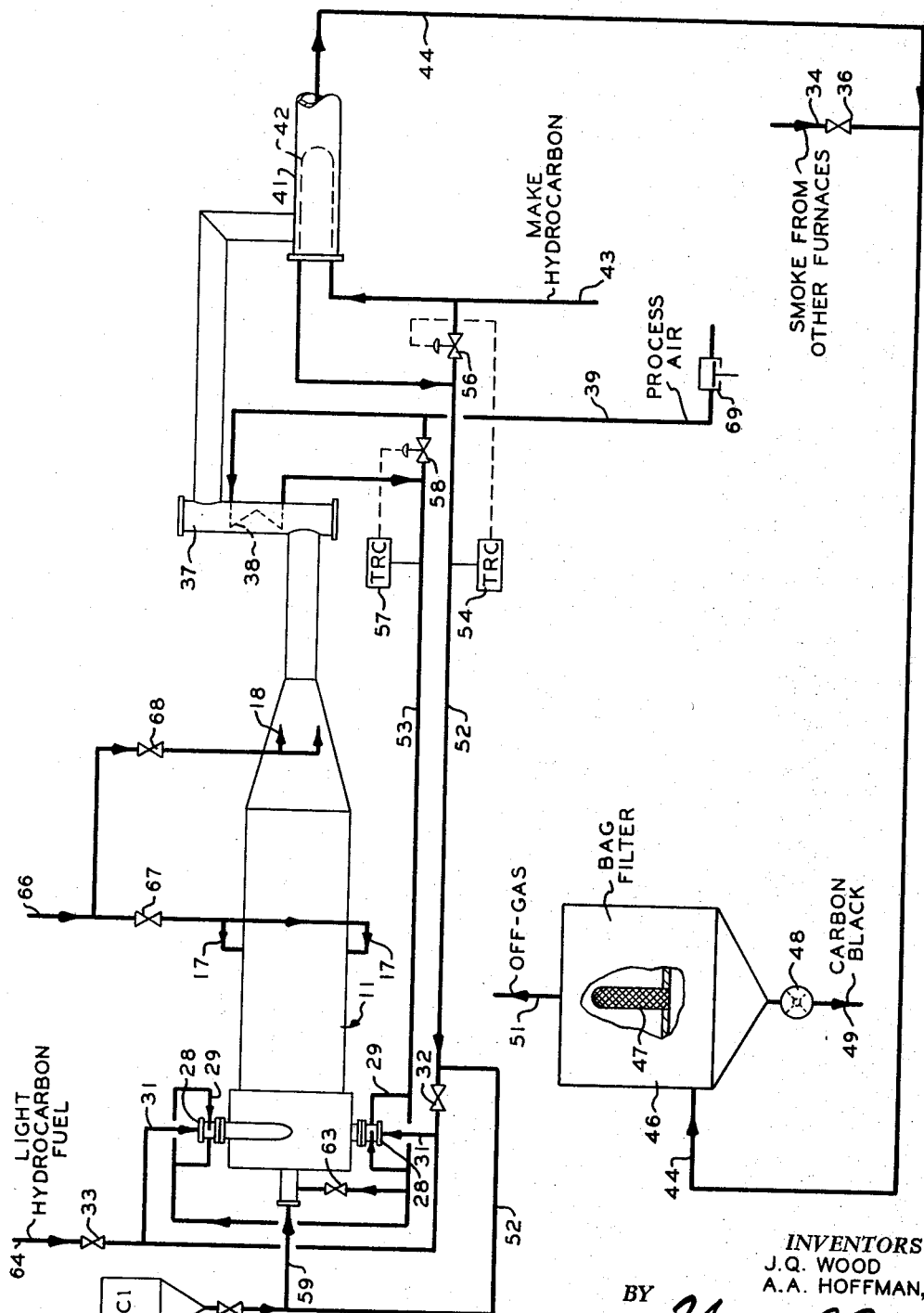

FIGURE 6 is an elevational view of the carbon black furnace of FIGURE 1 shown in a carbon black plant with its outlet end connected to a flue containing indirect heat exchangers for process air and for make hydrocarbon, said flue connected to a bag filter, along with supply lines and controls for process air, make hydrocarbon, light hydrocarbon fuel and additives such as potassium chloride, or other alkali metal-containing compounds, if such are desired.

In FIGURE 1 a carbon black furnace of the present invention generally designated as 11 has a generally cylindrical bore divided into four sections in series, namely axial inlet section 12, combustion chamber section 13, reaction section 14, an enlarged reaction and/or quench section 16. When quenching with direct heat exchange with an injected water spray quench is occurring at 17, then 16 is a quench section, but when the water spray quench is located at 18, then all of 16 upstream (to the left) of 18 is a reaction section and only that portion 19 downstream of quench 18 is a quench section. A single quench spray, or a plurality thereof spaced radially in substantially the same plane normal to the axis of the reaction section, may be employed, two being shown at 17 and four at 18, as is actually preferred.

The construction of the furnace is conventional, with a steel outer shell 21, an intermediate layer of suitable heat-insulating material 22 such as "Kaocast," and an inner lining of a suitable refractory 23 such as "Mullfrax-W" or "Carbofrax." "Kaocast" is a trademark for a 3000° F. kaolin base, refractory-castable material supplied by Babcock & Wilcox, Refractories Division. "Mullfrax-W" is a trademark for refractory products made from artificially prepared mullite ($3Al_2O_3 \cdot 2SiO_2$, molecular weight 425.86) manufactured and supplied in shapes or as cement by the Carborundum Company. "Carbofrax" is a trademark for a high grade silicon carbide refractory, at least 85 percent SiC, supplied in shapes or cement by the Carborundum Company. Those skilled in the art know of other suitable materials.

In FIGURE 2, burner tunnels 24 are shown substantially tangent to the inner wall of combustion chamber 13. Sleeves or liner tubes 26, made of similar refractory as lining 23, may be provided to reduce the size of tunnels 24 where they are connected by flange 27 to the fuel and air supply manifold 28 into which air preferably enters tangentially through the air line, and light hydrocarbon fuel is sprayed in or injected through nozzle 31. While preferably air is employed because it is cheap and available, any free oxygen-containing gas can obviously be substituted. In the prior art the air has often been modified by adding inert gases, or enriching with oxygen or with off-gas 51 (none of these being shown, as they are merely prior art ways of producing free oxygen-containing gas from air). The light hydrocarbon fuel can be anything from methane to kerosene or gas oil, and if desired the make hydrocarbon itself can be used by opening valve 32 and closing valve 33 in FIGURE 6. While the preferred burner construction 28, 29 and 31 is shown in FIGURE 2, obviously other burners known to the prior art can be substituted with variable results in the practice of this invention.

FIGURE 3 is a cross section along the line 3—3 of FIGURE 1 and shows the preferred water spray quench adjacent this point with four radial water sprays 18 spaced at 90° intervals. FIGURE 4 is a similar view taken at 4—4 and shows the preferred two adjacent quench sprays 17 spaced at 180° intervals.

FIGURE 5 is a cross section along line 5—5 of FIGURE 2, showing it is preferably annular in cross section.

In FIGURE 6 an entire carbon black plant is shown embodying the present invention. Only one furnace 11 is shown, but other similar furnaces (not shown) may be employed with their smoke entering the system through line 34 and valve 36. Furnace 11 discharges its smoke through indirect heat exchanger 37 to heat process air in section 38 of process air line 39, then through indirect heat exchanger 41 where make oil in section 42 of make hydrocarbon supply line 43 is heated, and then passes through line 44 to bag filter 46 where the filter bags 47 separate the carbon black (removed through star valve 48 in line 49) from the off gas removed through stack 51. Preheating air at 38 and/or oil at 42 is preferred, but is not critical, as the invention gives valuable results without any preheating. The temperature of preheating in lines 52 and 53 can be controlled respectively by temperature recorder-controller 54 controlling by-pass valve 56 and controller 57 controlling by-pass valve 58 to bypass enough cooler fluid to cool the fluid from heaters 42 and 38 to a predetermined temperature.

While the make hydrocarbon 43 may range anywhere from methane to heavy fuel oil in the practice of the present invention, it is preferred to use a liquid hydrocarbon feedstock having a BMCI (U.S. Bureau of Mines Correlation Index) of 85 to 160 and an API (American Petroleum Institute) gravity of less than 15, preferably 100 to 150 BMCI and −5 to 10° API. Such a make oil can be a petroleum residual oil or a coal tar residual oil, synthetic gas oils or tars from catalytic cracking, cracked residues, or vacuum still tarry residuums. The make oil is pyrolytically converted into carbon black by the heat of the fuel being burned in the furnace.

It is desired to adjust the axial make oil rate to a rate that will give maximum production of tar-free black. Because of this, the axial make oil rate for HAF carbon black is almost twice that for making ISAF carbon black in the same furnace, because it has twice as long a heat-soaking treatment to dry the tar and convert it to tar-free carbon black.

For the purpose of the present specification the standard chloroform extract of tar from said carbon black is obtained in the following manner:

The tar content of carbon black is determined by mixing 2 grams of black with 50 cc. of chloroform, boiling the mixture, filtering, and determining the percentage light transmittance of the filtrate as compared with the transmittance of a blank sample of chloroform. The comparison is preferably conducted with a photoelectric colorimeter such as a Lumetron colorimeter at a wave length of 440 m$\mu$, a light intensity of 20, and a cell 1 cm. long. A tar-free black is arbitrarily defined as one that shows a transmittance greater than 85 percent according to this procedure. Most commercial product specifications are more or less arbitrary, and this one is no exception. Acetone is sometimes substituted for chloroform in the test procedure. The percent transmittance equivalent to 85 percent with chloroform is about 92 percent with acetone. The original acetone or chloroform used for the test should be substantially colorless.

In operation, make hydrocarbon enters line 43, is preheated if desired at 42, and passes through line 52 and nozzle 59 axially into furnace 11. If desired, an additive can be added, such as a minor amount of an aqueous solution of potassium chloride, KCl, from the tank 61 through valve 62. Compressed process air enters line 39, is preheated if desired at 38, and passes through lines 53 and nozzles 29 into manifolds 28. If desired, to reduce deposits of carbonaceous material on nozzle 59 and in axial passage 12, some of the air from line 53 may be passed by valve 63 into annular space 12 around nozzle 59. Light hydrocarbon fuel enters line 64, passes through valve 33 and nozzles 31 into the furnace 11. The furnace 11 has been ignited by any means used in the prior art, such as by burning oil-soaked rags thrown in through opening 26 while manifold 28 is temporarily removed. If the furnace is to produce ISAF black, water from line 66 is passed through valve 67 into upstream quench 17, but if the furnace is to produce HAF black, valve 67 is closed and valve 68 is opened to activate downstream quench 18 only. The axial air rate through valve 63 and the tangential air rate through nozzles 29 remain exactly the same for the HAF or ISAF black, so that the rate of smoke in line 44 is substantially the same, thereby providing for the first time in the art the same optimum size for air compressors 69 and bag filter 46 for the same number of HAF or ISAF furnaces.

*Example*

A furnace is constructed as shown in the drawings with the following dimensions:

Length "A" from section 13 to quench 17 of 5 feet;
Length "B" from quench 17 to section 16 of 6 inches;
Length "C" from section 14 to quench 18 of 10 feet 4 inches;
Length "D" of combustion section 13 of 1 foot;
Internal diameter of section 13 of 3 feet 3 inches;
Internal diameter of section 14 of 1 foot;
Internal diameter of section 16 of 15 inches.

(The reason for the 6 inches at B is that it is mechanically too difficult to have quench pipes 17 come in exactly at the interface between sections 14 and 16. In theory, however, they could do so and achieve the same process effect.)

This furnace is operated to make HAF or ISAF carbon black with the reactor operating conditions given in Table I.

TABLE I

| Operating Conditions | Making HAF | Making ISAF |
|---|---|---|
| Make oil rate, gals./hr | 432 | 275 |
| Make oil quality, BMCI | 115 | 115 |
| Tangential oil rate, gals./hr | 125 | 125 |
| Axial air rate, M s.c.f.h | 4 | 4 |
| Tangential air rate, M s.c.f.h | 250 | 250 |
| Yield of carbon black, lbs./gal. make oil | 4.9 | 3.9 |
| Quench position, feet from section 13 | 15.8 | 5 |
| Carbon black product, lbs./day | 50,803 | 25,740 |
| Smoke to bag filters, lbs./day | 824,325 | 817,672 |
| Photelometer, chloroform, number | 90 | 90 |

The above values show that this furnace operates with the same quality make oil, same tangential fuel and air and axial air rates while making HAF and ISAF carbon black. The only differences are the position of the quench and the rate of addition of make oil. It will be noted that while the HAF process uses about twice the make oil and produces twice the carbon black as the ISAF process, the load of smoke to be handled by the bag filter system is about the same; therefore, this bag filter system is designed at economically the optimum size regardless of whether the furnaces are making HAF or ISAF carbon black.

The following average values of properties are obtained in making ISAF and HAF carbon black:

TABLE II

| Qualities | Carbon Black | |
|---|---|---|
| | ISAF | HAF |
| Average particle diameter, angstroms | 270 | 327 |
| Surface area, microscopy, m.$^2$/gm | 113 | 94 |
| Surface area, nitrogen, m.$^2$/gm | 108 | 76 |
| pH | 9.3 | 9.1 |
| Volatile matter, percent | 2.6 | 1.9 |
| Ash (dry pellets), percent | 0.38 | 0.28 |
| Ash (wet pellets), percent | 0.65 | 0.51 |
| Acetone extract, percent | 0.14 | 0.03 |
| Specific gravity | 1.784 | 1.795 |
| Photelometer, chloroform, number | Over 85 | Over 85 |

The critical dimensions of this furnace are that there be a chamber having an axial hydrocarbon inlet section 12, a tangential combustion section 13, an ISAF reaction section 14 and an HAF reaction section 16 connected in series, that the diameter of the combustion section be at least twice the diameter of the ISAF reaction section, the diameter of the HAF reaction section be from 1 1/16 to 1 2/3 the diameter of the ISAF reaction section, the distance to the ISAF quench in the ISAF reaction from the combustion section and the length of the ISAF reaction section be from 4.5 to 5.5 feet, and the distance to the HAF quench in the HAF reaction section from the ISAF reaction section and the length of the HAF reaction section be from 8 to 11 feet. When these dimensions are followed, the rate of effluent smoke production will be about the same when producing ISAF carbon black as when producing HAF black, as shown by the example given above.

While a specific example has been given for illustrative purposes, obviously the invention is not limited thereto, but includes such a range as will produce the useful result of producing about the same amount of effluent smoke during ISAF or HAF production.

We claim:

1. A furnace for making ISAF carbon black and HAF carbon black with about the same rate of effluent smoke production, comprising in combination a heat-insulated furnace having a chamber consisting essentially of the following four generally-cylindrical sections connected axially in series in the following order going downstream:

an axial hydrocarbon inlet section;
a combustion section provided with fuel and free oxygen-containing gas inlets;
an ISAF reaction section of a diameter less than half the diameter of said combustion section and between 4.5 to 5.5 feet long provided with an ISAF water quench adapted to discharge water spray therein adjacent the downstream end of said ISAF reaction section; and
an HAF reaction section of a diameter from 1 1/16 to 1 2/3 the diameter of said ISAF reaction section and between 8 to 11 feet long provided with an HAF water quench adapted to discharge water spray therein adjacent the downstream end of said HAF reaction section.

2. The combination of claim 1 in which the diameter of the combustion section is about 3 feet, the fuel and free oxygen-containing gas inlets are tangential to its inner surface, the diameter of the ISAF reaction section is about 1 foot and its length about 5 feet, and the diameter of the HAF reaction section is about 15 inches and its length about 10 feet.

References Cited

UNITED STATES PATENTS

| | | | |
|---|---|---|---|
| 2,971,822 | 2/1961 | Williams | 23—209.4 |
| 3,211,532 | 10/1965 | Henderson | 23—259.5 |
| 3,307,911 | 3/1967 | Krejci | 23—209.4 |

EDWARD J. MEROS, *Primary Examiner.*